(12) United States Patent
Koyanagi (10) Patent No.: US 7,864,382 B2
(45) Date of Patent: Jan. 4, 2011

(54) IMAGE-READING APPARATUS AND IMAGE-FORMING APPARATUS

(75) Inventor: Tsuyoshi Koyanagi, Osaka (JP)

(73) Assignee: Kyocera Mita Corporation (JP)

( * ) Notice: Subject to any disclaimer, the term of this patent is extended or adjusted under 35 U.S.C. 154(b) by 850 days.

(21) Appl. No.: 11/820,779

(22) Filed: Jun. 20, 2007

(65) Prior Publication Data
US 2007/0297831 A1 Dec. 27, 2007

(30) Foreign Application Priority Data
Jun. 21, 2006 (JP) .............................. 2006-171592

(51) Int. Cl.
*H04N 1/04* (2006.01)
(52) U.S. Cl. .................. 358/474; 358/494; 358/497
(58) Field of Classification Search ................. 358/474, 358/494, 497; 359/896, 196
See application file for complete search history.

(56) References Cited

U.S. PATENT DOCUMENTS
5,973,866 A * 10/1999 Tseng .................... 359/896

FOREIGN PATENT DOCUMENTS

| JP | 7-92575 | 4/1995 |
| JP | 7-104558 | 4/1995 |
| JP | 7-240821 | 9/1995 |
| JP | 9-289571 | 11/1997 |
| JP | 2001-235810 | 8/2001 |

* cited by examiner

*Primary Examiner*—Houshang Safaipour
(74) *Attorney, Agent, or Firm*—Gerald E. Hespos; Michael J. Porco (57) ABSTRACT

An image-reading apparatus, including a housing, a document table placed on the housing for receiving document, a movable optical unit placed on the document table for reading the image information on the document, the movable optical unit being placed reciprocally movably in the housing in directions parallel to the document table; a locking member placed movably on the housing external face for locking the movable optical unit; and a holding mechanism for holding the locking member variable in posture between a first posture of locking the movable optical unit and a second posture of unlocking the movable optical unit.

11 Claims, 7 Drawing Sheets

IMAGE-READING APPARATUS AND IMAGE-FORMING APPARATUS

BACKGROUND OF THE INVENTION

1. Field of the Invention

The present invention relates to an image-reading apparatus reading image information on a document optically and an image-forming apparatus equipped with the image-recording device.

2. Description of the Related Art

Image-reading apparatus have been used in image-forming apparatus such as copying machine, printer, and facsimile and also independently as monofunctional devices. Among these image-reading apparatus, there are some devices, in the housing of which information on a document is read by scanning of the document surface with a movable optical unit that is placed movably.

In such an image-reading apparatus, the movable optical unit is generally locked, for example, with a locking member in the housing, for prevention of dislocation of the optical unit by vibration or impact during shipment from production factory and damage thereof in the housing for example by collision to the wall. The movable optical unit has been locked inside the image-reading apparatus. For that reason, it was difficult for the user to unlock it, and thus, it was unlocked, for example, by a service engineer, when the image-reading apparatus was installed.

In the recent trend toward reduction in size, such an image-reading apparatus is carried or transported by the user more frequently. The user brings such an image-reading apparatus, for example, on change of address or redecoration of room.

However as described above, it was difficult for the user to lock or unlock the movable optical unit in conventional image-reading apparatus, resulting in increase in the possibility of damage of the movable optical units. In addition, it was necessary for example for a service man to visit the user after transportation of the image-reading apparatus for prevention of damage before it happens.

Under the circumstances above, proposed were many image-reading apparatus of which the movable optical unit could be locked and unlocked easily by the user. For example, Japanese Unexamined Patent Publication No. hei 7-92575 (D1) discloses a device in which the movable optical unit is locked and unlocked by using a removable operation lever that is operated as inserted from outside the housing.

Alternatively, Japanese Examined Patent Publication No. hei 7-104558 (D2) and Japanese Unexamined Patent Publication No. hei 7-240821 (D3) disclose devices in which the movable optical unit is locked and unlocked, as a screw or the like is inserted from outside the housing in the direction identical with the travelling direction of the movable optical unit. Yet alternatively, Japanese Unexamined Patent Publication No. hei 9-289571 (D4) discloses a device in which the movable optical unit is locked and unlocked by using a clip in the direction perpendicular to the travelling direction of the movable optical unit at the terminal of the movable optical unit opposite to its home position. Yet alternatively, Japanese unexamined patent publication 2001-235810 (D5) discloses a device in which the movable optical unit is held with a lifting-detecting rod and a revolving arm by operation to lift the housing.

However, in the device described in Literature D1, although the movable optical unit may be easily unlocked, it is quite difficult for the user to lock the unit once again, because an operation lever should be pushed into the housing carefully after complete understanding of the internal device structure.

Alternatively in the devices described in literatures D2 and D3, because the optical unit is locked and unlocked in the direction identical with the travelling direction of the movable optical unit, the movable optical unit may be dislocated easily by the pressure, for example from a screw, especially during locking, leading to deterioration in operability. In the device described in literature D4, in which the optical unit is locked and unlocked by a clip independent from the device main body, there is a concern about disappearance of the clip itself. Further, the device described in literature D5, which contains members such as lifting-detecting rod and revolving arm, will not satisfy the recent demand for reduction in size.

SUMMARY OF THE INVENTION

An object of the present invention is to provide an image-reading apparatus in a small and simple configuration allowing locking and unlocking of its movable optical unit reliably, and an image-forming apparatus equipped with the same.

The image-reading apparatus in an aspect of the invention satisfying the object comprises: a housing; a document table placed on the housing for receiving document; a movable optical unit used for reading the image information on the document placed on the document table, the movable optical unit being placed reciprocally movably in the housing in directions parallel to the document table; a locking member for locking the movable optical unit, the locking member being placed movably on the external surface of the housing; and a holding mechanism for holding the locking member variable in posture between a first posture of locking the movable optical unit and a second posture of unlocking the movable optical unit.

The image-forming apparatus in another aspect of the present invention comprises an image-reading unit reading image information on a document and an image-forming unit forming an image on recording sheet based on the image information, wherein the image-reading unit has the configuration of the image-reading apparatus above.

DETAILED DESCRIPTION OF THE PREFERRED EMBODIMENTS

Figure 7:
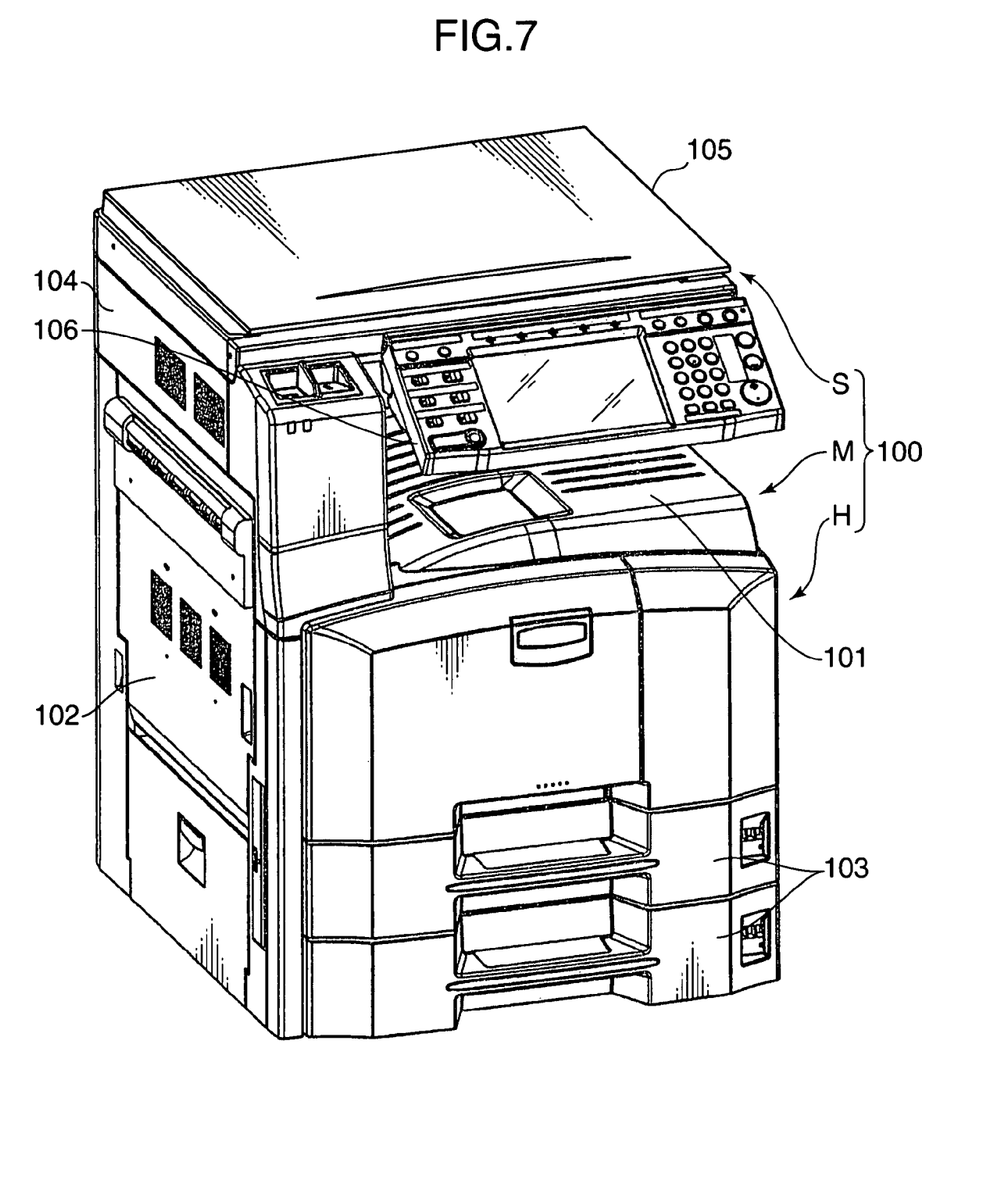
FIG. 7 is a schematic perspective view illustrating an example of the image-forming apparatus in another embodiment of the present invention.

Hereinafter, favorable embodiments of the present invention will be described in detail. FIG. 7 is a schematic perspective view illustrating an example of the image-forming apparatus 100 in an embodiment of the present invention. The image-forming apparatus 100, which is a so-called internal paper-discharging model, includes a device main body H (image-forming unit), an image-reading apparatus S connected to the top of the device main body H via a connecting unit M. The space formed between the device main body H and the image-reading apparatus S is used as a paper discharge unit, and there is a paper discharge tray 101 receiving the discharge image-formed paper formed on the device main body H.

The device main body H conducts operation for forming an image on paper, based on the image information read by the image-reading unit. The device main body H has, for example, a photoconductive drum, a charging device, an exposure device, a developing device, a cleaning device and a fixing device not shown in the Figure in a box-shaped external cover 102. A removable paper cassette 103 is connected to the bottom of the external cover 102, and a piece of paper is fed from the paper cassette 103 to the photoconductive drum one by one during image formation. The image formed on the basis of the image information optically acquired in the image-reading apparatus S is transferred onto the paper.

The photoconductive drum is placed rotably around a shaft, and an electrostatic latent image and a toner image are formed on the peripheral surface during rotation. An image is formed on the paper by transfer of the toner image on the peripheral surface.

The charging device applies uniform electric charge on the peripheral surface of the photoconductive drum. The exposure device forms an electrostatic latent image on the peripheral surface of the uniform electrically charged photoconductive drum by irradiation of a ray based on the image information of the document image read in the image-reading apparatus S. The developing device forms a toner image by supplying toner particles to the electrostatic latent image formed on the peripheral surface of the photoconductive drum. The cleaning device removes the residual toner remaining on the photoreceptor-drum peripheral surface after transfer of the toner image to paper and cleans the surface. The fixing device fixes the toner image on paper transferred from the photoreceptor-drum peripheral surface, and has inside, for example, a fixing roller containing a heating unit and a pressurization roller, of which the peripheral surface is in contact with that of the fixing roller.

The image-reading apparatus S is a device optically reading the image information on document, and has a flat rectangular upper external cover 104 containing a unit for reading the document image (internal housing 1 described below) and an openable document-holding cover 105 on the top face. The document-holding cover 105 is opened or closed by rotation of the cover around a particular site at the rear terminal as its supporting point, and holds the document placed on the document table 2 (see FIG. 1) when closed.

An operation panel 106 projecting outward is placed in front of the image-reading apparatus S. Image-forming processing is performed according to a predetermined procedure typed by the user on the various keys placed on the operation panel 106.

Hereinafter, the configuration of the image-reading apparatus S will be described in detail.

Figure 1:
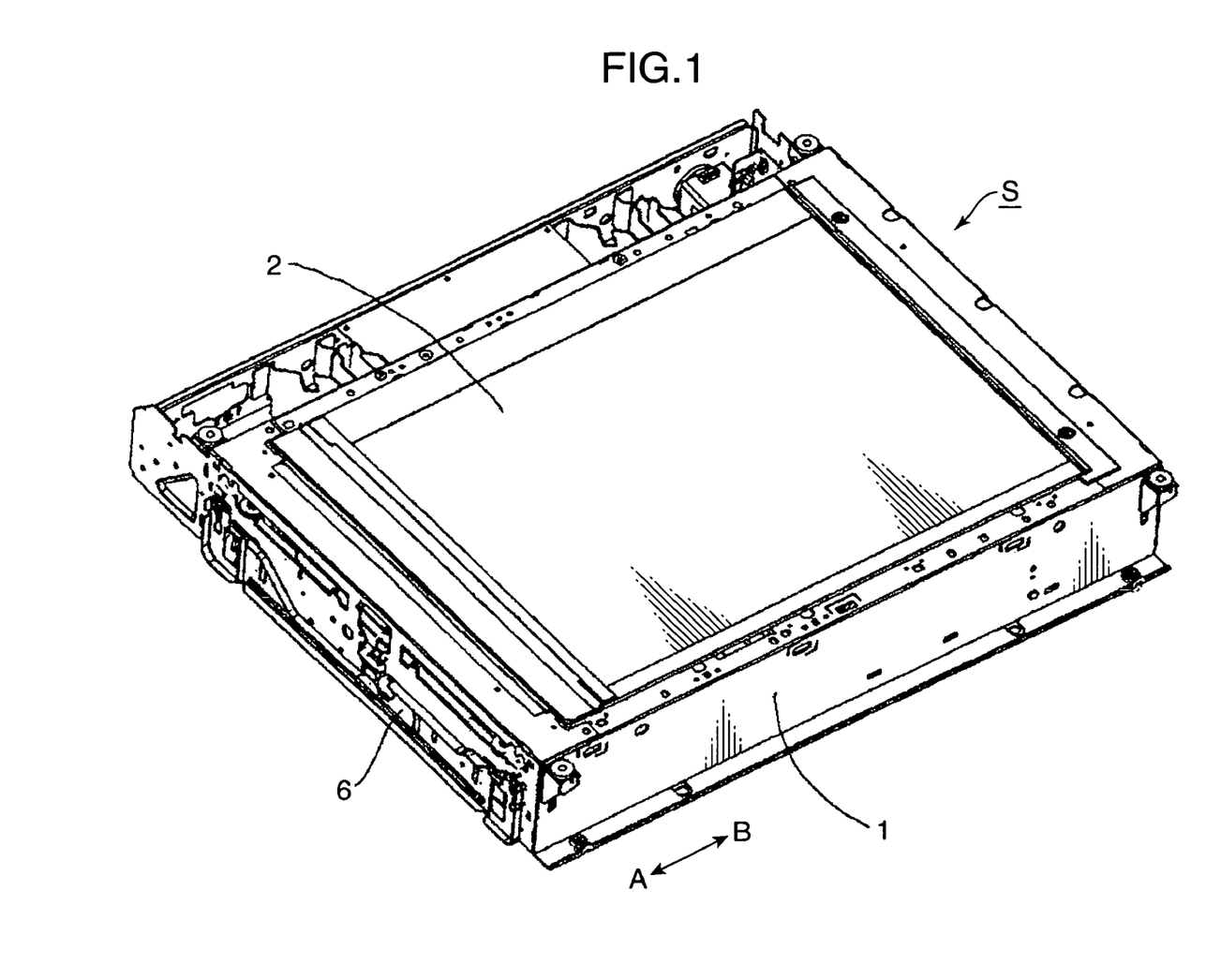
FIG. 1 is a schematic perspective view illustrating an example of the image-reading apparatus in an embodiment of the present invention.
Figure 2:
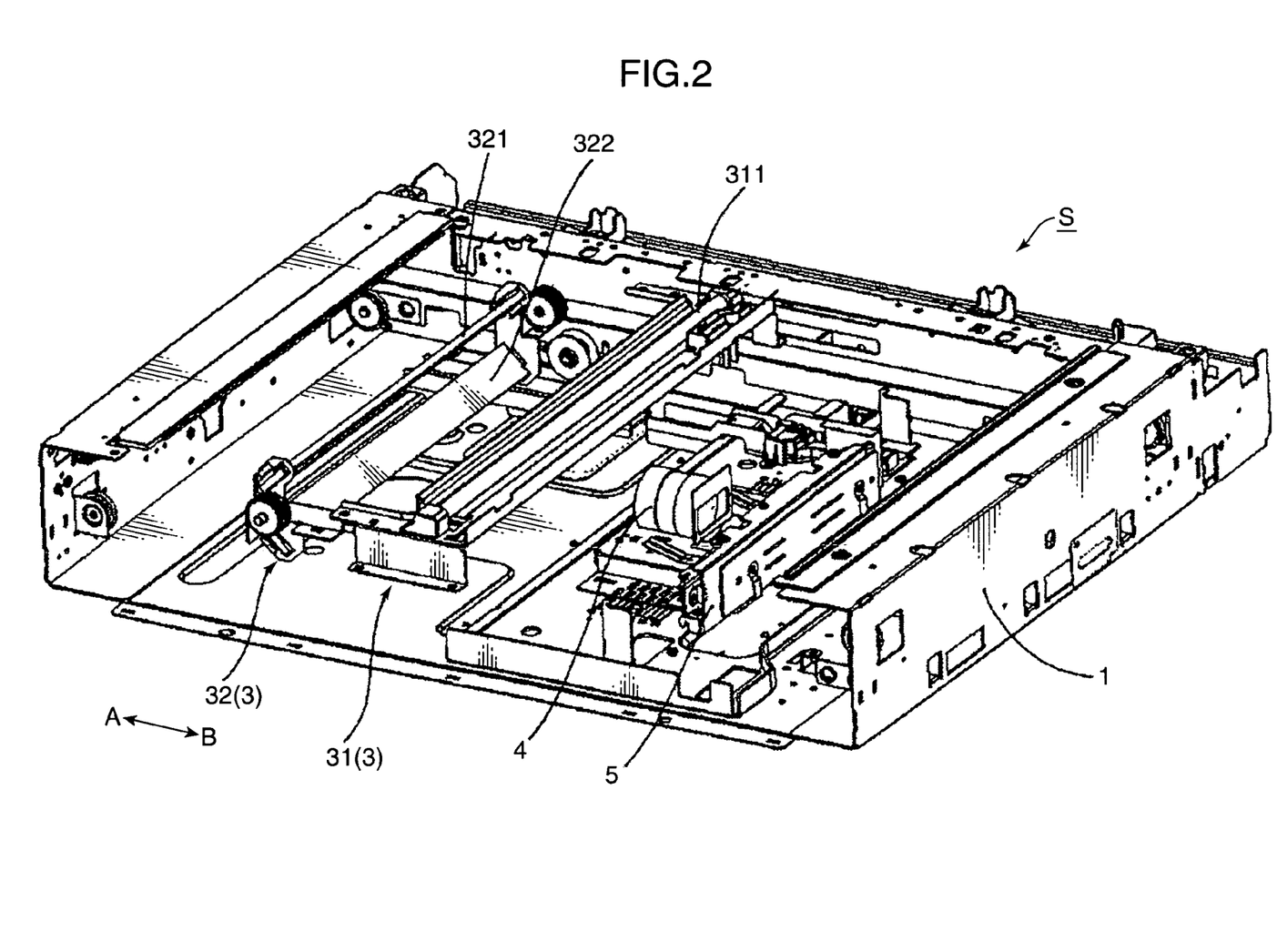
FIG. 2 is a schematic perspective view illustrating the internal structure of the image-reading apparatus.

FIG. 1 is schematic perspective view illustrating an example of the image-reading apparatus S according to the invention. FIG. 2 is a schematic perspective view illustrating the internal structure of the image-reading apparatus S. The upper external cover 104 and the document-holding cover 105 of the image-reading apparatus S are not shown in FIGS. 1 and 2.

The image-reading apparatus S has an almost rectangular box-shaped internal housing 1, a document table 2 placed on the top face opening of the internal housing 1, and an optical unit 3 placed movably reciprocally in directions parallel to the document table 2 in the internal housing 1.

The document table 2 of the image-reading apparatus S is placed with its face facing upward, and a document carrying the image information to be read is placed on the document table 2. The document to be copied (not shown in Figure) is placed thereon with its copying face (hereinafter, referred to as document face) facing the document table 2. The image information on the document is read by scanning of the document face with a movable optical unit 3 moving reciprocally, almost in the horizontal direction while the document is pressed and fixed by the document-holding cover 105 (see FIG. 7).

The movable optical unit 3 is placed movably in the direction parallel to the document face (arrow A-B direction in Figure) at the position immediately below the document table 2. The movable optical unit 3 has a light source unit 31 irradiating light onto the document and a mirror unit 32 redirecting the light reflected from the document face to an image-forming lens 4.

The light source unit 31 and the mirror unit 32 are made to have a width in the longitudinal direction identical with the width of the document table 2 (width in the direction perpendicular to the arrow A-B direction). The light source unit 31 and the mirror unit 32 are configured to move, for example, by belt or pulley, as the power from a driving source such as motor is transmitted.

Figure 3:
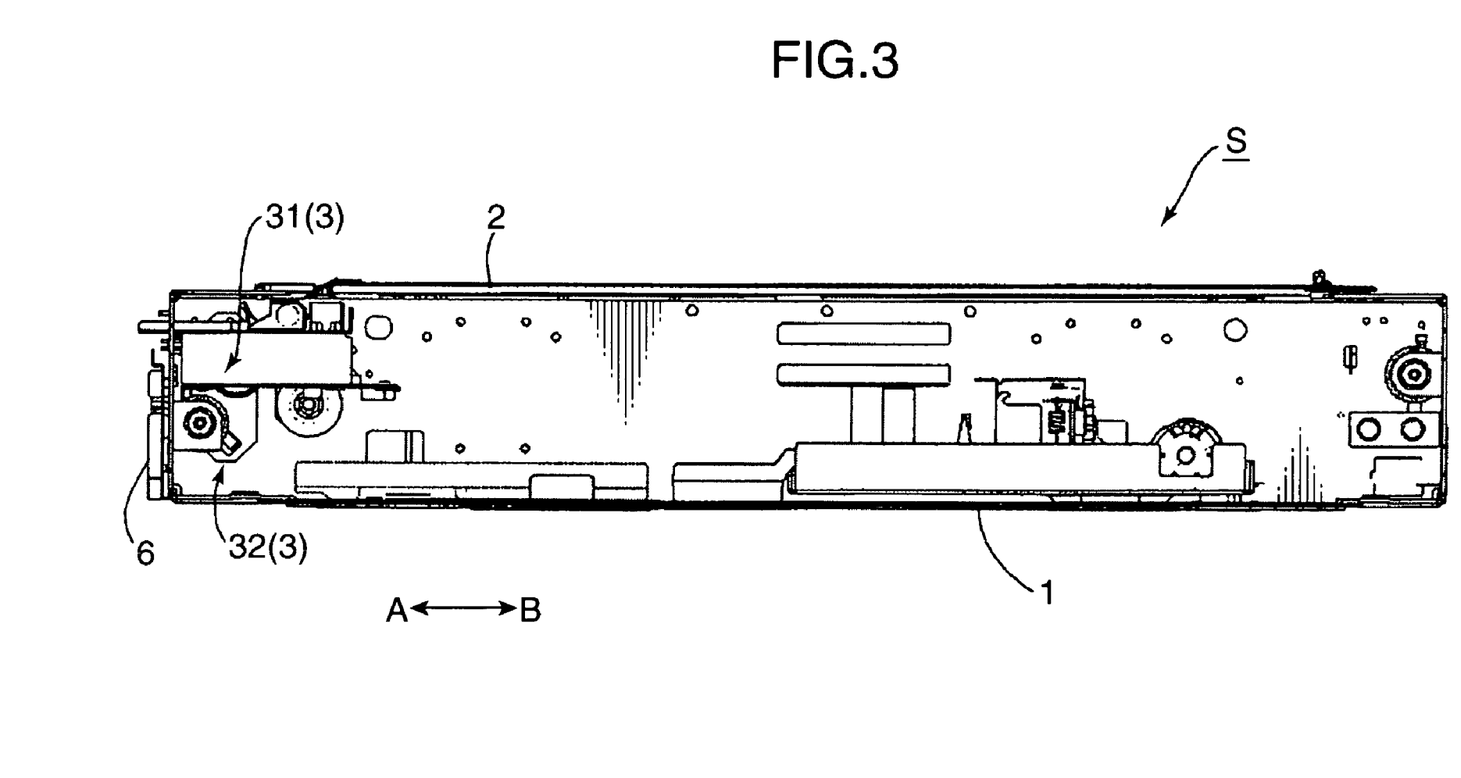
FIG. 3 is a schematic front view illustrating the internal structure of the image-reading apparatus.

The light source unit 31 and the mirror unit 32 are normally (during standby) located at the terminal position in the arrow A direction in the internal housing 1 (see FIG. 3), and they travels in the arrow B direction from the home position there during document reading. Then, the travelling speed ratio between the light source unit 31 and the mirror unit 32 is so controlled, for example by belt or pulley, that the light source unit 31 moves ahead. The travelling speed ratio between the light source unit 31 and the mirror unit is 32 is, for example, 2:1.

The light source unit 31 has a lamp 311 irradiating light onto the document face and a first mirror (not shown in Figure) reflecting the light of lamp 311 reflected on the document face to the home position direction (in the arrow A direction in Figure) The light reflected by the first mirror is reflected to the mirror unit 32 moving behind the light source unit 31 at the travelling speed ratio above.

The mirror unit 32 has a second mirror 321 and a third mirror 322 that further reflect the reflected light reflected by the first mirror. The second mirror 321 is located at a position almost at the same height and in parallel with the first mirror, and redirects the reflected light into the direction toward the bottom of the internal housing 1. The third mirror 322 is located at a position below the second mirror 321 in parallel therewith, and redirects the reflected light guided by the second mirror 321 to the anti-home-position direction (in the arrow B direction in Figure).

In the configuration above, when the document face is scanned sequentially in the direction from the home position to the anti-home position, the light reflected from the document face is guided, via the first mirror, the second mirror 321 and the third mirror 322, to an image-forming lens 4 placed as fixed at the position in the anti-home-position side. The reflected light is focused into a reading unit 5 such as CCD by the image-forming lens 4, and the optical information is converted into electrical signal in the reading unit 5. In this way, the image information on the document face is read.

Hereinafter, locking and unlocking of the movable optical unit 3 will be described. As described above, in the image-reading apparatus S it is necessary to fix the movable optical unit 3 for prevention of variation of the movable optical unit 3 by vibration or impact.

The image-reading apparatus S in the present embodiment has a locking member 6 placed movably reciprocally in the direction almost perpendicular to the travelling direction of the movable optical unit 3, or in the vertical direction on the external face of internal housing 1 in the home-position side of the movable optical unit 3. The posture of the locking member 6 is made variable between a first posture locking the movable optical unit 3 and a second posture of unlocking the movable optical unit 3.

Figure 4:
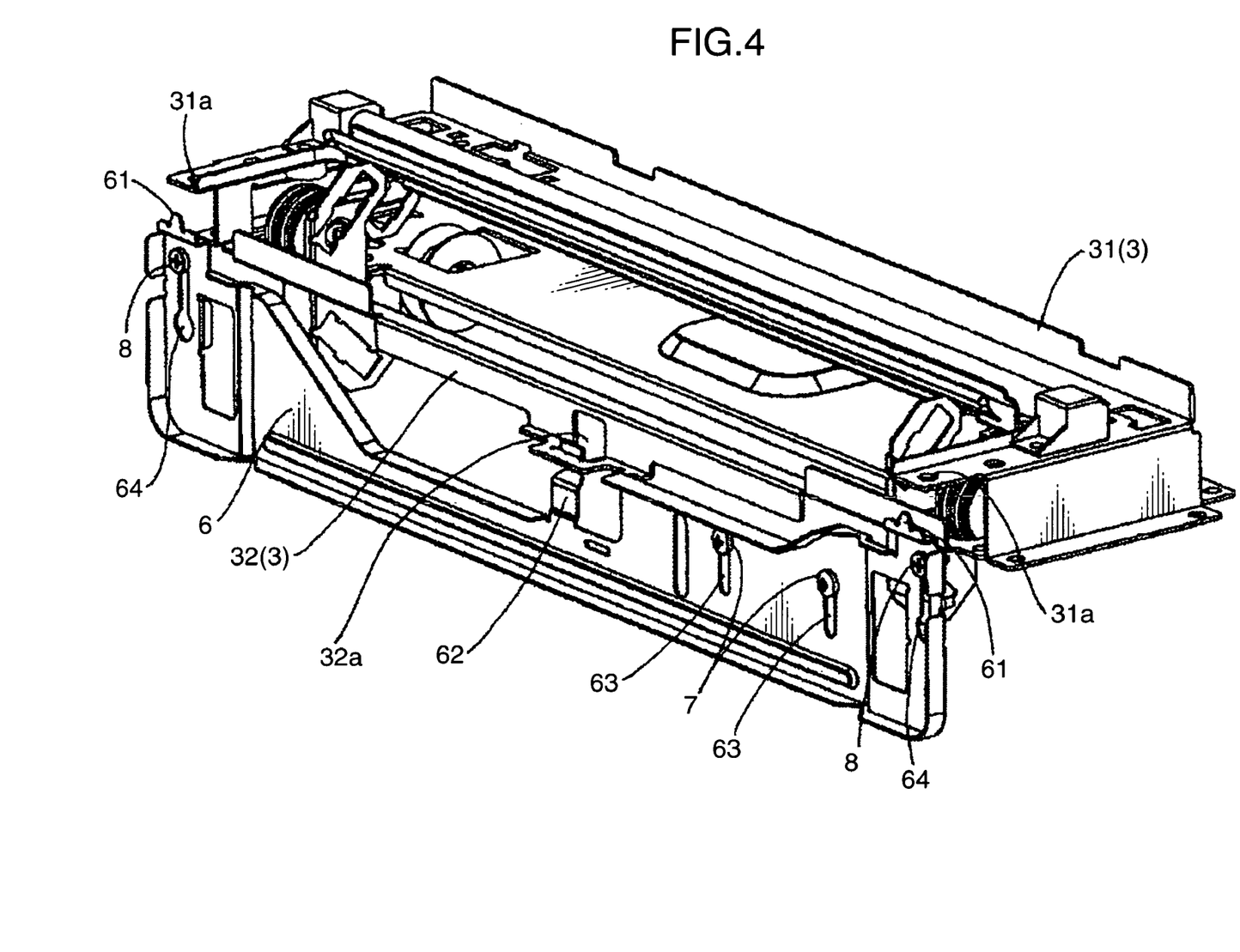
FIG. 4 is a partial expanded view of the image-reading apparatus illustrating the state where the locking member is unlocked.
Figure 5:
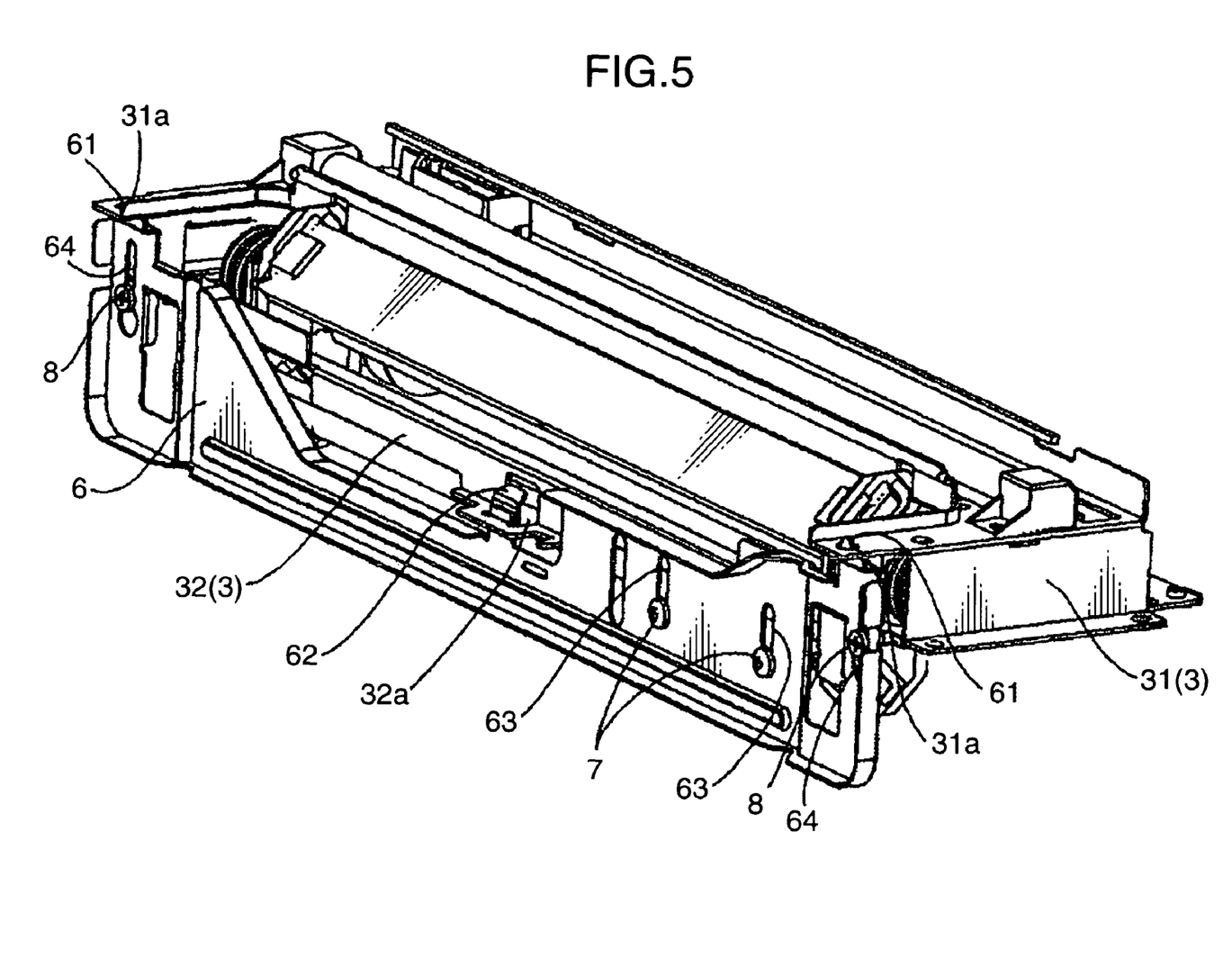
FIG. 5 is a partial expanded view of the image-reading apparatus illustrating the state where the locking member is locked.

FIG. 4 is a partially expanded view of the image-reading apparatus S in the present embodiment, wherein locking of the movable optical unit 3 by the locking member 6 is eliminated (second posture). On the other hand, FIG. 5 shows the movable optical unit 3 locked by the locking member 6 (first posture). The second mirror 321, the third mirror 322 and the internal housing 1 are not shown in FIG. 4, and the internal housing 1 is not shown in FIG. 5.

The locking member 6 is a so-called plate of a single uniform material, and a pair of first projections 61 and also a second projection 62 are formed respectively at the terminals and at the center. The first and second projections 61 and 62 are formed on the locking member 6 facing upward in parallel with the reciprocal travelling direction, and fit into the fitting region on the movable optical unit 3 described below.

The movable optical unit 3 has first fitting regions 31a and a second fitting region 32a as its fitting regions. The first fitting regions 31a are a pair of through-holes at both terminals in the longitudinal direction of the light source unit 31 and also at the terminal in the home position direction. Alternatively, the second fitting region 32a is a through-hole formed at the center of the mirror unit 32 and also at the terminal in the home position direction.

When the movable optical unit 3 is located at the home position, the area where the first and second fitting regions 31a and 32a are formed sticks out of the internal housing 1 (see FIG. 4) and becomes located above the first and second projections 61 and 62 described above. Then, the distance between the first projection 61 and the first fitting region 31a is designed to become identical with the distance between the second projection 62 and the second fitting region 32a.

In the configuration above, it is possible to lock and unlock the movable optical unit 3, by reciprocal movement of the locking member 6 in the vertical direction. Thus when the locking member 6 is moved upward, the first and second projections 61 and 62 fit into the first and second fitting regions 31a and 32a, as they are inserted therein. The light source unit 31 and the mirror unit 32 on the movable optical unit 3 are thus, respectively fixed to the internal housing 1. Alternatively, downward move of the locking member 6 leads to dissociation of the first and second projections 61 and 62 from the first and second fitting regions 31a and 32a and thus to unlocking of the light source unit 31 and mirror unit 32.

It is thus possible to lock and unlock the movable optical unit 3 reliably in a simple configuration. In addition, there is no independent part needed for locking or unlocking (parts needed during locking or unlocking) and thus, there is no concern about loss of such parts. Because it is made with a minimum number of components, i.e., a single locking member 6, it is possible to reduce the size and additionally the cost of the device significantly.

The image-reading apparatus S has a holding mechanism of fixing the locking member 6 to the internal housing 1 at a particular position. The holding mechanism holds the locking member 6 variably between the first and second postures. The holding mechanism in the present embodiment has a holding member 7 for positioning the locking member 6 in the internal housing 1.

The holding member 7 is a screw (hereinafter, referred to as screw 7) to be screwed into the internal housing 1, and, as shown in FIGS. 4 and 5, two screws are connected to the internal housing 1 while they are screwed through the two screw holes 63 formed on the locking member 6. The locking member 6 is fixed to the internal housing 1 when the screws 7 are tightened, and becomes movable when loosened.

The screw hole 63 is a hole formed longer in the vertical direction allowing locking and unlocking of the movable optical unit 3 by reciprocal movement of the locking member 6. The locking member 6 descends by its self weight when the screw 7 is loosened, unlocking the movable optical unit 3.

Thus, the movable optical unit 3 is locked by making the first and second projections 61 and 62 fit into the first and second fitting regions 31a and 32a by upward movement of the locking member 6 and then tightening the screws 7. Alternatively, it is unlocked only by loosening the screws 7, as the locking member 6 descends by its self weight and the fitting between the first and second projections 61 and 62 and the first and second fitting regions 31a and 32a is disconnected.

Thus, it is possible to lock the posture of the locking member 6 by tightening the screws 7 and vary the posture of locking member 6 by loosening the screws 7. It is thus possible to lock and unlock the movable optical unit 3 reliably and easily.

The length of the screw hole 63 described above is not particularly limited, if the locking member 6 is movable reciprocally and the movable optical unit 3 can be locked and unlocked. Two screws 7 and two screw holes 63 are formed in the right side in FIGS. 4 and 5, but the configuration is not limited thereto, and may be modified properly.

It is also preferable to place a guide mechanism for guiding reciprocating movement of the locking member 6. As shown in FIGS. 4 and 5, in the present embodiment, the guide mechanism has a pair of terminal guiding members 8 placed on the internal housing 1 and guide holes 64 allowing insertion of the guiding members 8 that are formed below the first and second projections 61 and 62 of the locking member 6. Thus, it is possible to move the locking member 6 reciprocally, less forcibly.

Needless to say, the guide holes 64 are formed as elongated holes and the length thereof is made equivalent to or more than that of the screw hole 63. The connection of the guiding member 8 to the internal housing 1 is not particularly limited, but is preferably performed by screwing. Thus, the guiding member and also the screw 7 are connected by screwing, it becomes relatively easier to install a locking member 6 later on a conventional image-reading apparatus having no such a locking member 6.

Figure 6:
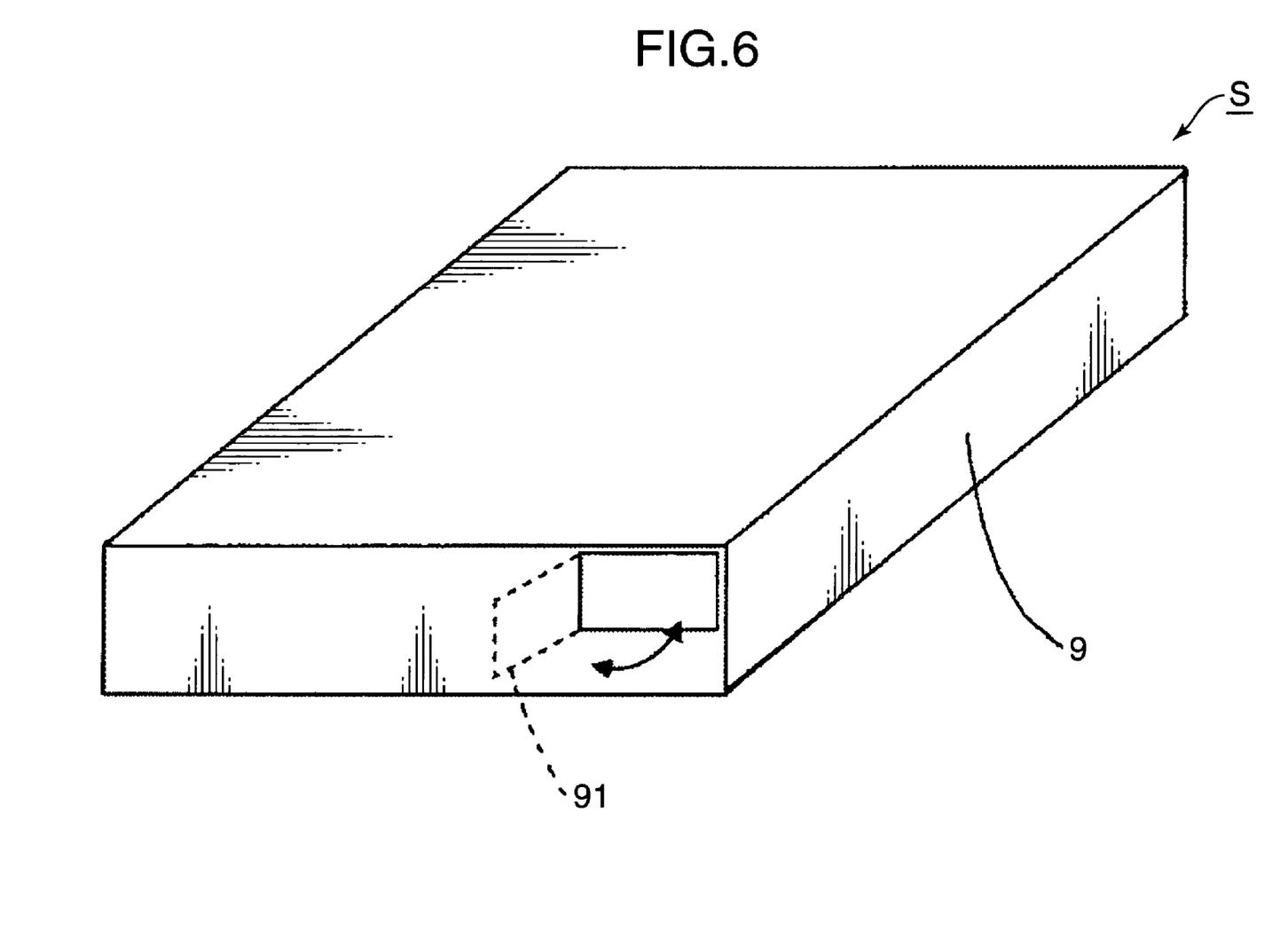
FIG. 6 is a schematic perspective view illustrating an example of the external cover member of the image-reading apparatus.

Practically in locking and unlocking the movable optical unit 3, a door 91 may be formed on the side wall of the external cover member 9 covering the internal housing 1 (upper external cover 104 in FIG. 1) and the operation may be carried out while the door 91 is open, as shown in FIG. 6.

In addition, it is possible to provide an image-forming apparatus allowing reliable and easy locking an unlocking of the movable optical unit 3 by using the image-reading apparatus S in an image-forming apparatus such as copying machine, printer, or facsimile.

The typical embodiments described above mainly include the inventions in the following configurations.

The image-reading apparatus in an aspect of the present invention is an image-reading apparatus, comprising a housing; a document table placed on the housing for receiving document; a movable optical unit used for reading the image information on the document placed on the document table, the movable optical unit being placed reciprocally movably in the housing in directions parallel to the document table; a locking member placed movably on the housing external face for locking the movable optical unit; and a holding mechanism for holding the locking member variable in posture between a first posture of locking the movable optical unit and a second posture of unlocking the movable optical unit.

In the aspect of the invention, it is possible to lock and unlock the movable optical unit in a simple configuration, because the locking member is made variable in posture between a first posture locking the movable optical unit and a second posture unlocking it. In addition, there is no additional independent parts needed during locking or unlocking, and thus, there is no concern about the loss thereof. Because it is made with a minimum number of components, it is possible to reduce the size and the cost of the device significantly.

In the aspect above, the locking member is preferably placed reciprocally movably in directions almost perpendicular to the travelling direction of the movable optical unit. In the aspect above, there is no need for placing a travelling space for locking member in the travelling direction of the movable optical unit, even when a locking member is installed.

In the aspect above, the holding mechanism preferably has a holding member for positioning the locking member relatively to the housing. In the aspect above, it is possible to hold the locking member by using the housing and thus to simplify the structure of the holding mechanism.

Preferably in the aspect above, the holding member is a screw to be screwed into the housing; the locking member has a screw hole allowing insertion of the screw; and the posture of the locking member is locked when the screw is tightened and modified when the screw is loosened. In the aspect above, it is possible to modify the posture of the locking member in a simple operation of tightening or loosening a screw.

Preferably in the aspect above, the first posture is a state where the holding member is locking the locking member at a higher position, and the second posture is a state where the locking member has descended by its self weight while the locking by the holding member is eliminated. In the aspect above, it is possible to unlock the movable optical unit by using the self weight of the locking member and thus to improve the simplicity of operation.

Preferably in the configuration, the locking member has a guide mechanism guiding the reciprocating movement additionally, wherein the guide mechanism includes a guiding member placed on the housing and a guide hole formed on the locking member, and the guiding member supports the locking member as it is inserted into the guide hole. In the aspect above, it is possible to move the locking member reciprocally, less forcibly.

The image-forming apparatus in another aspect of the present invention comprises an image-reading unit reading the image information on a document optically and an image-forming unit forming an image on recording paper based on the image information, wherein the image-reading unit includes the configuration of the image-reading apparatus above. In the aspect above, it is possible to provide an image-forming apparatus allowing reliable and easy locking and unlocking of the movable optical unit.

This application is based on patent application No. 2006-171592 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An image-reading apparatus, comprising:
   a housing;
   a document table placed on the housing for receiving document;
   a movable optical unit used for reading the image information on the document placed on the document table, the movable optical unit being placed reciprocally movably in the housing in directions parallel to the document table;
   a locking member for locking the movable optical unit, the locking member being placed movably on the external surface of the housing and being formed with a screw hole; and
   a holding mechanism for holding the locking member variable in posture between a first posture of locking the movable optical unit and a second posture of unlocking the movable optical unit, the holding mechanism including a screw inserted through the screw hole in the locking member and screwed into the housing, the posture of the locking member being fixed when the screw is tightened and being modified when the screw is loosened.

2. An image-reading apparatus comprising:
   a housing;
   a document table placed on the housing for receiving document;
   a movable optical unit used for reading the image information on the document placed on the document table, the movable optical unit being placed reciprocally movably in the housing in directions parallel to the document table;
   a locking member for locking the movable optical unit, the locking member being placed movably on the external surface of the housing;
   a holding mechanism for holding the locking member variable in posture between a first posture of locking the movable optical unit and a second posture of unlocking the movable optical unit; and
   a guide mechanism guiding the reciprocating movement of the locking member, wherein
   the guide mechanism includes a guiding member placed on the housing and a guide hole formed on the locking member, and the guiding member supports the locking member as it is inserted into the guide hole.

3. The image-reading apparatus according to claim 2, wherein
the holding mechanism includes a holding member for positioning the locking member relatively to the housing.

4. The image-reading apparatus according to claim 3, wherein
the holding member is a screw screwed into the housing;
the locking member has a screw hole allowing insertion of the screw; and
the posture of the locking member is fixed when the screw is tightened and modified when the screw is loosened.

5. The image-reading apparatus according to claim 3, wherein
the first posture is a state where the holding member is locking the locking member at a higher position, and
the second posture is a state where the locking by the holding member is eliminated as the locking member has descended by its self weight.

6. The image-reading apparatus according to claim 1, wherein the locking member is placed reciprocally movably in directions almost perpendicular to the travelling direction of the movable optical unit.

7. An image-forming apparatus, comprising:
an image-reading unit of optically reading the image information on a document; and
an image-forming unit forming an image on recording sheet based on the image information; wherein
the image-reading unit includes
a housing;
a document table placed on the housing for receiving document;
a movable optical unit placed on the document table for reading the image information on the document, the movable optical unit being placed reciprocally movably in the housing in directions parallel to the document table;
a locking member for locking the movable optical unit, the locking member being placed movably on the external surface of the housing;
a holding mechanism for holding the locking member variable in posture between a first posture of locking the movable optical unit and a second posture of unlocking the movable optical unit; and
a guide mechanism guiding the reciprocating movement of the locking member, wherein
the guide mechanism includes a guiding member placed on the housing and a guide hole formed on the locking member, and
the guiding member supports the locking member as it is inserted into the guide hole.

8. The image-forming apparatus according to claim 7, wherein
the locking member is placed reciprocally movably in directions almost perpendicular to the travelling direction of the movable optical unit.

9. The image-forming apparatus according to claim 7, wherein
the holding mechanism includes a holding member for positioning the locking member relatively to the housing.

10. The image-forming apparatus according to claim 9, wherein
the holding member is a screw to be screwed into the housing;
the locking member has a screw hole allowing insertion of the screw; and
the posture of the locking member is fixed when the screw is tightened and modified when the screw is loosened.

11. The image-forming apparatus according to claim 9, wherein
the first posture is a state where the holding member is locking the locking member at a higher position, and
the second posture is a state where the locking by the holding member is eliminated as the locking member has descended by its self weight.

* * * * *